G. H. ELMORE.
CENTRIFUGAL PUMP.
APPLICATION FILED MAR. 28, 1917.

1,357,628.

Patented Nov. 2, 1920.
2 SHEETS—SHEET 1.

Inventor
Guy H. Elmore
By Dodge & Sons
Attorneys

UNITED STATES PATENT OFFICE.

GUY H. ELMORE, OF SWARTHMORE, PENNSYLVANIA.

CENTRIFUGAL PUMP.

1,357,628.

Specification of Letters Patent.

Patented Nov. 2, 1920.

Application filed March 28, 1917. Serial No. 158,016.

*To all whom it may concern:*

Be it known that I, GUY H. ELMORE, a citizen of the United States, residing at Swarthmore, in the county of Delaware and State of Pennsylvania, have invented certain new and useful Improvements in Centrifugal Pumps, of which the following is a specification.

This invention relates to centrifugal pumps and particularly to wood lined pumps for use in handling chemically active liquids such as mine water which would destroy iron pump casings if directly subjected to its action.

The object is to provide a simple wood lined pump in which the wood elements are adequately supported and braced so as to permit the use of desirably small clearances, and in which the wood parts are readily renewable.

To secure this effect I make use of metallic shells or housings supported directly on the metal pump base, and clamp the wood portions between these housings, the housings providing the necessary strength, independently of the wood, to sustain the entire mechanical load. An ancillary feature is a special protective lining for the wooden portion.

A preferred construction is illustrated in the accompanying drawings in which:—

Figures 1, 2:
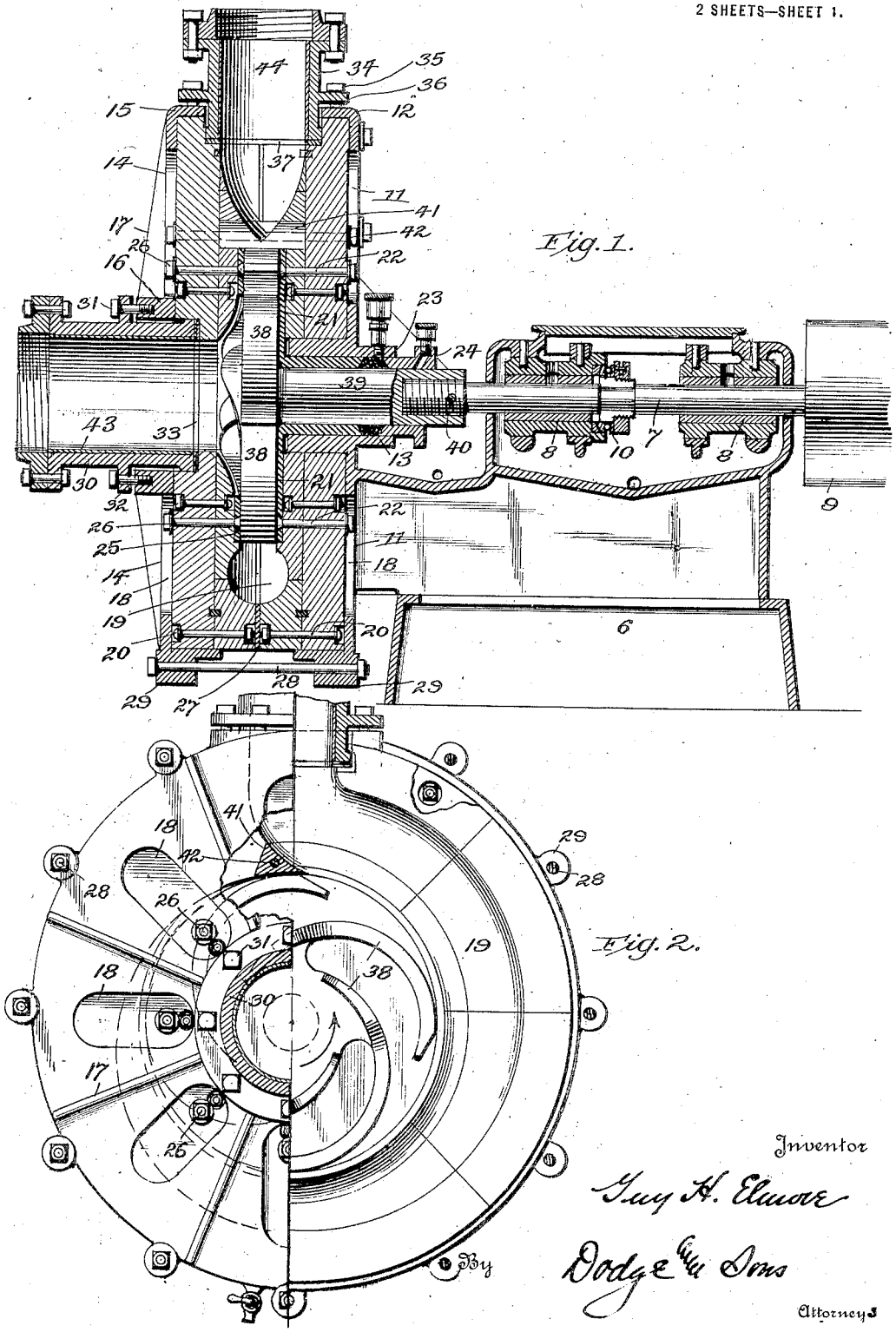
Figure 1 is a vertical axial section of the complete device.
Fig. 2 is an end elevation, parts being broken away to show the internal construction.
Figure 3:
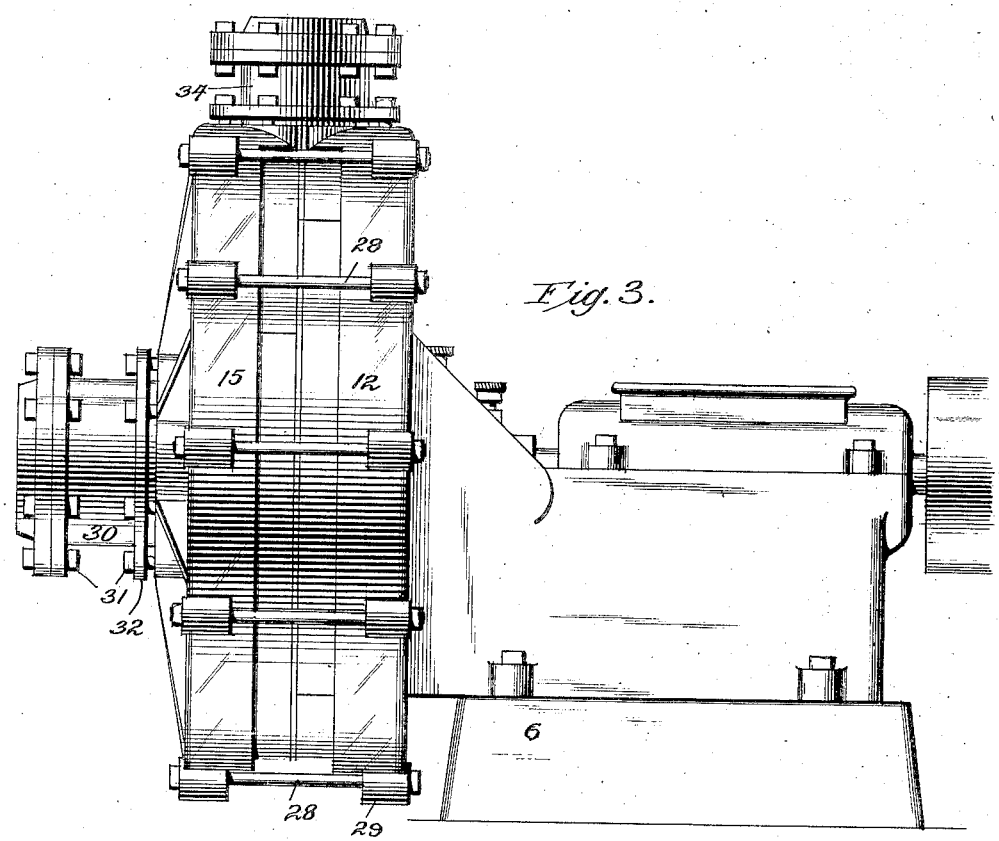
Fig. 3 is a side elevation of the complete pump.

In the drawings, 6 represents the pump base which supports the entire mechanism, and 7 is the drive shaft mounted in bearings 8, therein, and driven by a pulley 9. Between the bearings 8 the shaft is provided with a ball thrust-bearing 10.

Cast integrally with the base 6 is one-half 11 of the divided housing, which has a peripheral annular flange 12 and a central tube or sleeve 13 to support the bearing bushing for the pump shaft. The other or removable part of the housing is an annular plate 14 having an annular peripheral flange 15 similar to flange 12 and a central tube or ring 16 in which the intake or suction pipe is mounted. The part 14 has radial ribs 17 and both the parts 11 and 14 have openings 18 to reduce the weight and also to give clearance for bolt heads, etc., on the wooden insert elements.

The wooden insert is made in two parts or sections which when assembled form the desired volute chamber 19 whose central plane is on the plane of separation of the two parts. The two halves are formed of a number of suitably formed blocks or planks bolted together by the bolts 20, as best shown in Fig. 1. The right hand section (as viewed in Fig. 1) has a combined face plate and bearing bushing 21 of bronze which projects into sleeve 13 and which is held in place by bolts 22. The end of this bushing, together with sleeve 13 forms a packing gland 23 in which packing is compressed by a ring 24. The left hand section of the wood insert has a facing ring 25 of bronze surrounding the suction or inlet passage and held by bolts 26.

The two sections of the wooden insert are not bolted together, but are assembled, with an intervening gasket 27, between the parts 11 and 14 of the housing and are clamped between these by means of the annular series of bolts 28 passing through the lugs 29.

The intake pipe 30 is held in place by screws 31 passing through a flange 32 and entering the end of sleeve 16. It bears at its end against packing 33 in a recess formed in the outer side of the left section of the wooden insert.

The discharge pipe 34 is held in place by screws 35 passing through a flange 36 and entering the flanges 12 and 15. The end of the pipe bears against packing 37 in a recess formed at the top of the two wood sections and communicates with the large or discharge end of the volute chamber 19.

The pump rotor or impeller is of the conventional type having the volute vanes or blades 38 of bronze carried on a bronze shaft 39 extending out beyond the stuffing box 23 and there threaded and staked to the drive shaft 7 as clearly shown at 40 in Fig. 1.

A bronze insert 41 is placed at the point where the discharge passage branches off from the volute chamber 19 and is held by a single through-bolt 42 as shown.

The suction and exhaust pipes 30 and 34 may be of bronze but preferably are lead or bronze bushed as indicated at 43 and 44 respectively.

It should be noted that each wood section is a laminated structure, the wood grain in successive laminations being crossed. In forming these sections the wood is first bolted up and the volute passage and intake and discharge openings etc. are then carved out.

Figure 4:
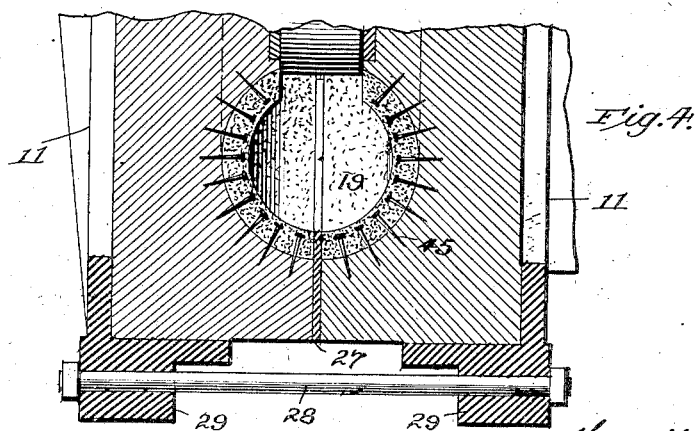
Fig. 4 is a fragmentary section on an enlarged scale showing the special lining in place.

When necessary to protect the wood from scouring I use a reinforcing lining shown in Fig. 4 but omitted from the remaining figures for clearness. The volute chamber 19 is carved slightly larger and is studded with projecting copper nails 45 after which a coating of asphaltum and sand is worked in around the nail heads. This coating resists wear and is renewable.

In either construction above described no iron parts and particularly no parts of the supporting frame come into contact with the water pumped. This result is secured with a minimum use of bronze or other relatively expensive metal. The wooden inserts are held against warping; are fully supported; and are subjected to little or no mechanical wear or stress. Another important feature is that the alinement of the impeller shaft with the drive shaft is maintained by the housing and pump base, and will ordinarily not be effected by the removal and replacement of the wooden elements.

Minor variations are obviously possible and fall within the scope of the invention.

Where strong chemicals or agents likely to injure the wooden inserts are present in the liquid handled, such inserts may be made of or faced with porcelain, cement, or other material unaffected thereby. The asphaltum and sand facing above mentioned is merely one example of such acid-resisting material or preparation.

Having thus described my invention, what I claim is:—

1. The combination of a divided metallic housing; a two-part pump casing of non-metallic chemically inert material, formed with an impeller chamber and inlet and discharge openings, clamped between the parts of said housings and supported thereby; a rotary impeller; a bearing for said impeller supported by said housing; and a pipe communicating with one of the openings of said casing, attached to the housing and held thereby in sealing engagement with the casing.

2. The combination of a divided metallic housing; a two-part pump casing of non-metallic chemically inert material, formed with an impeller chamber and inlet and discharge openings, clamped between the parts of said housings and supported thereby; a rotary impeller; a bearing for said impeller supported by said housing; and pipes communicating with the inlet and discharge openings of said casing, attached to the housing, and held thereby in sealing engagement with the casing.

3. The combination of a two-part housing including a base section and a removable section releasably connected thereto; a two-part pump casing of non-metallic chemically inert material formed with an impeller chamber and inlet and discharge openings, and clamped between the sections of said housing; a rotary impeller; a bearing for said impeller supported on the base section of said housing; a pipe communicating with the inlet opening of the casing, attached to the removable section of the housing and held thereby in sealing engagement with the casing; and a pipe communicating with the outlet opening of the casing, attached to the housing and held thereby in sealing engagement with the casing.

4. The combination of a divided metallic housing; a two-part pump casing of non-metallic chemically inert material, formed with an impeller chamber and inlet and discharge openings; a pipe communicating with one of said openings, attached to said housing and held thereby in sealing engagement with said casing; and a rotary impeller mounted in said chamber.

5. The combination of a divided metallic housing; a two-part pump casing of laminated wooden construction formed with an impeller chamber and inlet and discharge openings; clamped between the parts of said housing and supported thereby; an adhesive sand concrete lining in said impeller chamber; metallic bonding means extending into said lining and wood casing; a rotary impeller; and a bearing for said impeller supported by said housing.

6. The combination of a two-part housing including a base section and a removable section releasably connected thereto; a two-part pump casing of laminated wood construction formed with an impeller chamber and inlet and discharge openings, and clamped between the sections of said housing; an adhesive sand concrete lining in said impeller chamber; metallic bonding means extending into said lining and wood casing; a rotary impeller; and a bearing for said impeller supported on the base section of said housing.

In testimony whereof I have signed my name to this specification.

GUY H. ELMORE.